United States Patent [19]

Mukaiya

[11] Patent Number: 4,846,563
[45] Date of Patent: Jul. 11, 1989

[54] COMPACT ZOOM LENS OF LARGE APERTURE RATIO

[75] Inventor: Hitoshi Mukaiya, Saitama, Japan

[73] Assignee: Canon Kabushiki Kaisha, Tokyo, Japan

[21] Appl. No.: 156,935

[22] Filed: Feb. 17, 1988

[30] Foreign Application Priority Data

Feb. 18, 1987 [JP] Japan .................. 62-035265
Nov. 5, 1987 [JP] Japan .................. 62-279833

[51] Int. Cl.$^4$ ............................................. G02B 15/14
[52] U.S. Cl. ................................................... 350/427
[58] Field of Search ........................................ 350/427

[56] References Cited

U.S. PATENT DOCUMENTS 4,621,905 11/1986 Kato et al. ..................... 350/427

Primary Examiner—Rodney B. Bovernick
Assistant Examiner—Rebecca D. Gass
Attorney, Agent, or Firm—Fitzpatrick, Cella, Harper & Scinto

[57] ABSTRACT

A zoom lens comprising a positive first lens unit for focusing, a negative second lens unit as the variator, a negative third lens unit as the compensator, a positive fourth lens unit for making afocal the diverging light beam from the third unit in travelling thereacross, and an image forming or fifth lens unit having six lenses, satisfying the following conditions:

$$0.7 < |R_{4,2}/F_4| < 0.85$$

$$1.05 < |f_{5,2}/F_5| < 1.5$$

$$0.6 < |f_{5,4}/f_{5,5}| < 1.5$$

$$50 < (\nu_{5,1} + \nu_{5,6})/2 \ 59$$

where $R_{4,2}$ is the radius of curvature of the second surface counting from front of the fourth lens unit, $F_4$ and $F_5$ are the focal lengths of the fourth and fifth lens units respectively; $f_{5,2}$, $f_{5,4}$, and $f_{5,5}$ are the focal lengths of the second, fourth and fifth lenses in the fifth lens unit, and $\nu_{5,1}$ and $\nu_{5,6}$ are the Abbe numbers of the glasses of the first and sixth lenses in the fifth lens unit, respectively.

5 Claims, 5 Drawing Sheets

COMPACT ZOOM LENS OF LARGE APERTURE RATIO

BACKGROUND OF THE INVENTION

1. Field of the Invention

This invention relates to zoom lenses and, more particularly, to zoom lenses of increased relative aperture with good optical performance over the entire zooming range, while still permitting the physical size to me minimized with the total length shortened to be suited to photographic cameras, video cameras, etc.

2. Description of the Related Art

To photographic cameras and video cameras there has been a demand for a zoom lens having a good compromise between the requirement of increasing the relative aperture with a high range and the requirement of reducing the bulk and size in such a manner that high grade optical performance is preserved.

Of these, for the video camera, because of its image pickup element being relatively low in sensitivity, the zoom lens has to get as high a relative aperture as possible.

At present, the ⅔ in. image pickup tube is widely used in the video camera from the two points of view of compactness and image quality. Also, from the standpoint of good manageability and high facility for further minimization of the size, 8 m/m video cameras are coming to be used in gradually increasing numbers. The image pickup tube to be used in this camera is required to be furthermore reduced in size while preserving high grade imagery. Recently the ½ in. image pickup tube or plate has found its use in 8 m/m video cameras.

If the zoom lens is of the so-called 4-unit type in principle, it is in general case that an increase of the relative aperture to as high as 1.4–1.6 or thereabout in F-number can be achieved when proper rules of lens design are set forth particularly for the fourth lens unit that is arranged on the image side of the zoom section to be stationary during zooming, and the image forming section or the fifth lens unit to well correct the residual aberrations of the zoom section.

Also, in order to shorten the total length of the entire lens system, the effective method is to reduce the bulk and size of the front or first lens unit. To allow for this to be achieved, the F-number may be increased. But, to avoid the F-number from being so much increased, it becomes important to set forth proper rules of design for the image forming section.

In addition thereto, if the reduction of the physical size of the entire lens system and the increase of the relative aperture are attempted by relying merely on strengthening of the refractive power of each lens unit, then the spherical aberration in the paraxial region, the coma from the zonal to the marginal region, and higher order aberrations such as sagittal halo are increased largely. So, it becomes difficult to get high optical performance.

Suppose, for example, the front or first lens unit is selected for shortening the total length by the method of increasing the refractive power, then the overall magnifying power of the zoom section up to the image forming section has to be increased. As a result, the first lens unit produces many aberrations, and the tolerances for the lens design parameters becomes severer. Thus, it becomes difficult to assure the prescribed optical performance.

Also, in the case of using the ⅔ in. image pickup element, according to the prior art, the total length L of the entire lens system in terms of the diagonal $\phi_A$ of the effective picture frame falls in a range of $10\phi_A$ to $12\phi_A$, as disclosed in Japanese Laid-Open Patent Application No. Sho 60-260912. This implies that the total length of the entire lens system is caused to become comparatively long. Like this, it has been very difficult to achieve a reduction of the total length L to shorter than $10\phi_A$ in such a manner that good optical performance is preserved throughout the zooming range. As other concomitant techniques mention may be made of U.S. Pat. Nos. 4,518,228, 4,525,036, 4,618,219, 4,621,905, 4,653,874, and 4,659,187.

SUMMARY OF THE INVENTION

An object of the present invention is to provide a zoom lens having a small F-number, a high zoom ratio and the standard image angle at the wide angle end with the size of the entire lens system being reduced while still permitting high grade optical performance to be preserved throughout the entire zooming range.

The zoom lens of the invention comprises, from front to rear, a first lens unit of positive power for focusing, a second lens unit of negative power having the magnification varying function, a third lens unit of negative power for compensating for the shift of an image plane resulting from the variation of the magnification, a fourth lens unit having a positive lens for making the diverging light beam from the third lens unit an almost parallel light beam, and a fifth lens unit having an image forming function and having lenses of positive, negative, positive, negative, positive and positive powers in this order, wherein letting the focal length of the j-th lens in the i-th lens unit be denoted by $f_{i,j}$, the radius of curvatyre of the j-th lens surface in the i-th lens unit by $R_{i,j}$, the Abbe number of the glass of the j-th lens in the i-th lens unit by $\nu_{i,j}$, and the focal length of the i-th lens unit by $F_i$, the following conditions are satisfied:

$$0.7 < |R_{4,2}/F_4| < 0.85 \qquad (1)$$

$$1.05 < |f_{5,2}/F_5| < 1.5 \qquad (2)$$

$$0.6 < |f_{5,4}/f_{5,5}| < 1.5 \qquad (3)$$

$$50 < (\nu_{5,1} + \nu_{5,6})/2 < 59 \qquad (4)$$

BRIEF DESCRIPTION OF THE DRAWINGS

FIGS. 2(A) and 2(B) to FIGS. 5(A) and 5(B) are graphic representations of the aberrations of numerical examples 1 to 4 of the invention respectively, with FIGS. 2(A), 3(A), 4(A) and 5(A) in the wide angle end, and FIGS. 2(B), 3(B), 4(B) and 5(B) ij tge telephoto end.

DETAILED DESCRIPTION OF THE PREFERRED EMBODIMENTS

Figure 1:
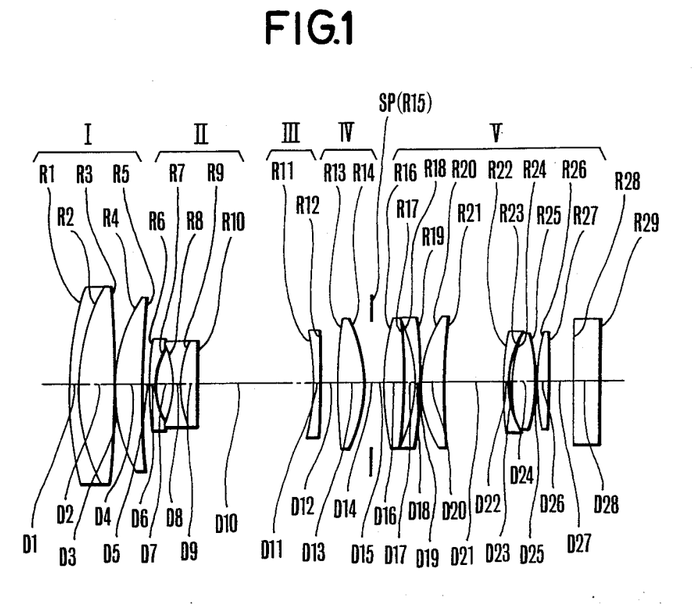
FIG. 1 is a longitudinal section view of a typical one of examples of specific zoom lenses of the invention.

FIG. 1 shows the form of a zoom lens of the invention in correspondence to numerical examples thereof. In the figure, I is a first lens unit of positive refractive power axially movable for focusing. II is a second lens unit of negative refractive power axially movable for varying the image magnification. III is a third lens unit of negative refractive power for compensating for the shift of an image plane as it occurs when the image magnification varies. IV is a fourth lens unit of positive refractive power for making the diverging light beam incident thereon from the third lens unit III almost afocal in emerging therefrom. V is a fixed fifth lens unit having the image forming function and comprising six lens elements of positive, negative, positive, negative, positive and positive powers in this order. SP is a fixed, aperture size-variable diaphragm.

In the embodiments of the invention, in such a zoom type, by satisfying the above-mentioned inequalities of conditions (1)–(4) for the construction and arrangement of the elements of the fourth and fifth lens units, despite a great increase in each of the relative aperture and the range of variation of the magnification, good correction of aberrations is achieved for high grade optical performance throughout the entire zooming range.

The technical signifcances of the above-defined conditions each are explained below.

The inequalities of condition (1) represent the range of refracting power for the rear surface of the first lens in the fourth lens unit. The use of a lens form of strong rearward curvature in the first lens of the fourth lens unit leads to production of various aberrations, particularly spherical aberration and coma, when the light beam diverging in passing through the first to the third lens units travels across that lens. In order that the light beam leaves as an almost afocal one for the fifth lens unit without causing such aberrations to be increased as far as possible, the condition (1) must be satisfied.

Also, the requirement of making up the almost afocal beam from the diverging light beam of the third lens unit, when fulfilled, unequivocally determines the refractive power for the fourth lens. For this reason, when the refracting power of the rear lens surface becomes too weak as exceeding beyond the upper limit of the inequalities of condition (1), the refracting power of the front lens surface must be so much increased. As a result, the tendency toward under-correction of spherical aberration is intensified. When the refracting power of the rear lens surface becomes too strong beyond the lower limit, on the other hand, the coma is increased largely.

The inequalities of condition (2) give a range of refractive power ratio for the second lens in the fifth lens unit to the whole of the fifth lens unit to well correct particularly spherical aberration. When the upper limit is exceeded, it is over-corrected. When the lower limit is exceeded, under-correction comes to result.

The inequalities of condition (3) give a range of refractive power ratio for the fourth and fifth lenses in the fifth lens unit to well correct astigmatism without causing other aberrations, mainly coma, to be produced as far as possible. When the upper limit is exceeded, the coma is increased largely. When the lower limit is exceeded, the astigmatism becomes difficult to well correct.

The inequalities of condition (4) give a range of the Abbe numbers of the media of the first and sixth lenses in the fifth lens unit to correct longitudinal and lateral chromatic aberrations in good balance. When the upper limit is exceeded, over-correction of longitudinal chromatic aberration results. When the lower limit is exceeded, the lateral chromatic aberration is under-corrected objectionably.

In order to achieve a reduction of the physical length of the entire lens system while minimizing the variation with zooming of the aberrations, it is preferred to satisfy the following condition:

$$0.75 < |F_2/F_w| < 0.85 \quad (5)$$

where Fw is the shortest focal length of the entire system.

The factor in the inequalities of condition (5) represents the refractive power of the second lens unit. When the lower limit is exceeded, the refractive power of the second lens unit becomes too strong, causing the range of variation of aberrations with zooming to increase. When the refractive power of the second lens unit becomes weak beyond the upper limit, the physical length is increased objectionably, because it must be compensated for by increasing the total zooming movement of the second lens unit to obtain the equivalent zoom ratio.

The objects of the invention are accomplished when all the conditions set forth above are satisfied. Yet, to achieve a further improvement of the aberration correction, it is preferred that the fourth and fifth lens units are constructed in such forms as described below.

The fourth lens unit is a bi-convex lens with the rear surface of strong curvature toward the rear. The fifth lens unit comprises, from front to rear, a bi-convex first lens with the front surface having a stronger curvature than the rear surface, a negative meniscus-shaped second lens of forward convexity, a positive third lens with the front surface of strong curvature toward the front, a negative meniscus-shaped fourth lens of forward convexity, a bi-convex fifth lens with the rear surface of strong curvature, and a positive sixth lens with the front surface of strong curvature toward the front. The air separation between the third and fourth lenses is longest in this lens unit.

It should be noted that the term "rear surface of strong curvature" means that it is compared with the curvature of the other or front surface. This applies to the term "front surface of strong curvature" as well. By designing the fourth and fifth lens units in such a way, the residual aberrations, for example, spherical aberration and inward coma from the zonal to the marginal region of the picture frame, of the zoom section are corrected entirely in good balance.

Four examples of specific zoom lenses of the invention can be constructed in accordance with the numerical data given in the following tables for the radii of curvature, R, the axial thicknesses or air separations, D, and the refractive indices, N, and Abbe numbers, $\nu$, of the glasses of the various lenses with the subscriptions numbered consecutively from front to rear. A block defined between flat surfaces R28 and R29 represents a face plate, or a filter.

The values of the factors in the above-cited conditions for the numerical examples are given in Table 1.

Figure 2A:
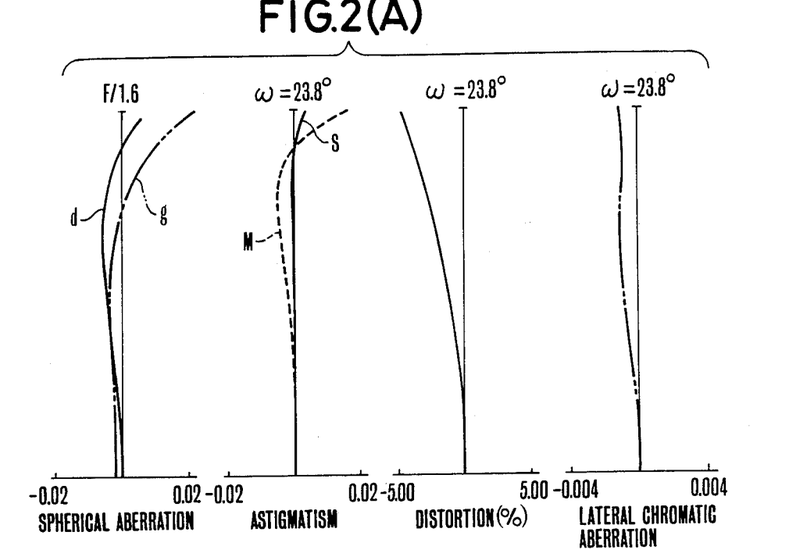
Figure 2B:
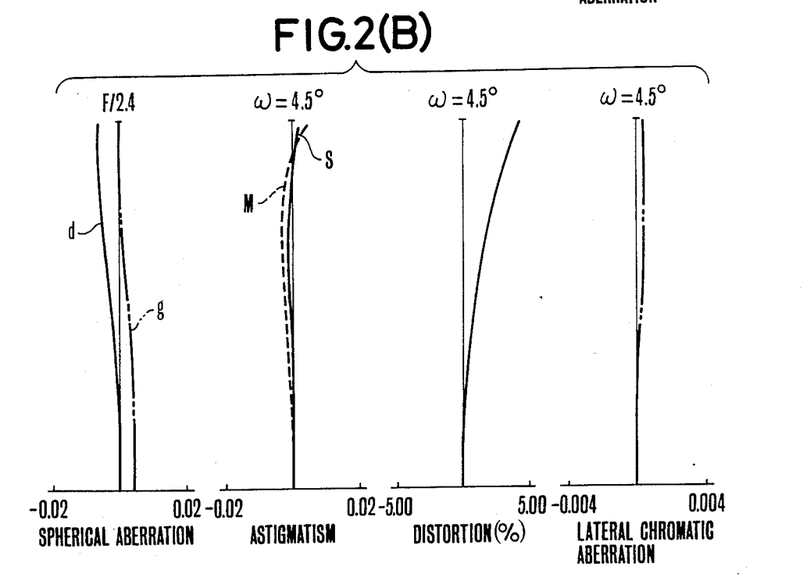

| Numerical Example 1 (FIGS. 2(A) and 2(B)) | | | |
|---|---|---|---|
| F = 1–5.56  FNo = 1:1.6–2.4  2ω = 47.6°–9.0° | | | |
| R1 = 4.9342 | D1 = 0.0945 | N1 = 1.80518 | ν1 = 25.4 |
| R2 = 2.3937 | D2 = 0.4961 | N2 = 1.51633 | ν2 = 64.1 |
| R3 = −10.2228 | D3 = 0.0118 | | |
| R4 = 2.1189 | D4 = 0.3622 | N3 = 1.60311 | ν3 = 60.7 |
| R5 = 11.8103 | D5 = Variable | | |
| R6 = 5.1504 | D6 = 0.0630 | N4 = 1.69680 | ν4 = 55.5 |
| R7 = 0.9067 | D7 = 0.2717 | | |
| R8 = −1.1671 | D8 = 0.0630 | N5 = 1.69680 | ν5 = 55.5 |
| R9 = 1.1671 | D9 = 0.2441 | N6 = 1.84666 | ν6 = 23.9 |
| R10 = 11.5367 | D10 = Variable | | |
| R11 = −2.2007 | D11 = 0.0630 | N7 = 1.71300 | ν7 = 53.8 |
| R12 = −50.7152 | D12 = Variable | | |
| R13 = 9.2253 | D13 = 0.3465 | N8 = 1.69680 | ν8 = 55.5 |
| R14 = −1.7144 | D14 = 0.0787 | | |

-continued

Numerical Example 1 (FIGS. 2(A) and 2(B))
F = 1–5.56  FNo = 1:1.6–2.4  2ω = 47.6°–9.0°

| | | | |
|---|---|---|---|
| R15 = Stop | D15 = 0.1575 | | |
| R16 = 2.7254 | D16 = 0.2913 | N9 = 1.65844 | ν9 = 50.9 |
| R17 = −11.0099 | D17 = 0.1417 | | |
| R18 = −1.8215 | D18 = 0.0866 | N10 = 1.84666 | ν10 = 23.9 |
| R19 = −7.3111 | D19 = 0.0118 | | |
| R20 = 1.6340 | D20 = 0.2520 | N11 = 1.56384 | ν11 = 60.7 |
| R21 = 6.1695 | D21 = 0.8189 | | |
| R22 = 2.5700 | D22 = 0.0630 | N12 = 1.83400 | ν12 = 37.2 |
| R23 = 1.2021 | D23 = 0.1024 | | |
| R24 = 1.8982 | D24 = 0.2362 | N13 = 1.51633 | ν13 = 64.1 |
| R25 = −2.9332 | D25 = 0.0118 | | |
| R26 = 3.6846 | D26 = 0.2283 | N14 = 1.51742 | ν14 = 52.4 |
| R27 = −15.6427 | D27 = 0.3150 | | |
| R28 = ∞ | D28 = 0.4331 | N15 = 1.51633 | ν15 = 64.1 |
| R29 = ∞ | | | |

| f | 1 | 5.56 |
|---|---|---|
| D5 | 0.0910 | 1.5119 |
| D10 | 1.5019 | 0.2231 |
| D12 | 0.2359 | 0.0938 |
| Total Length = 8.109 (= 9.19 · φ$_{EA}$) | | |

Figure 3A:
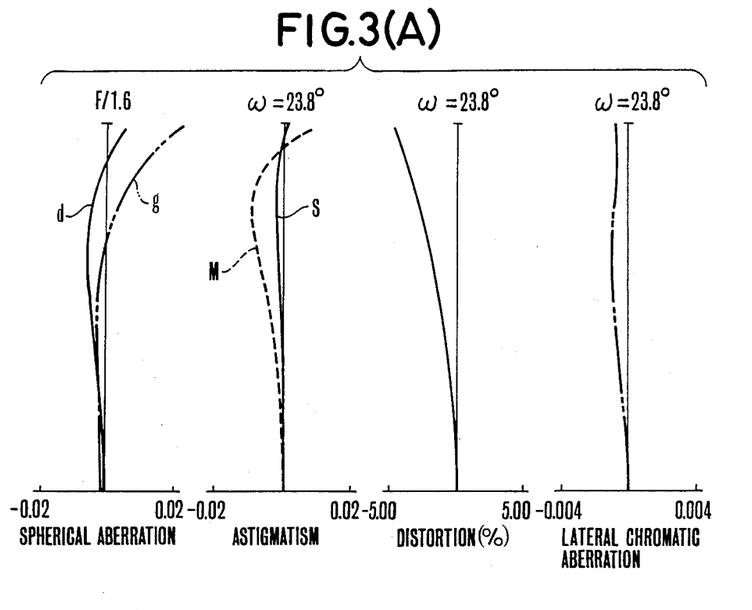
Figure 3B:
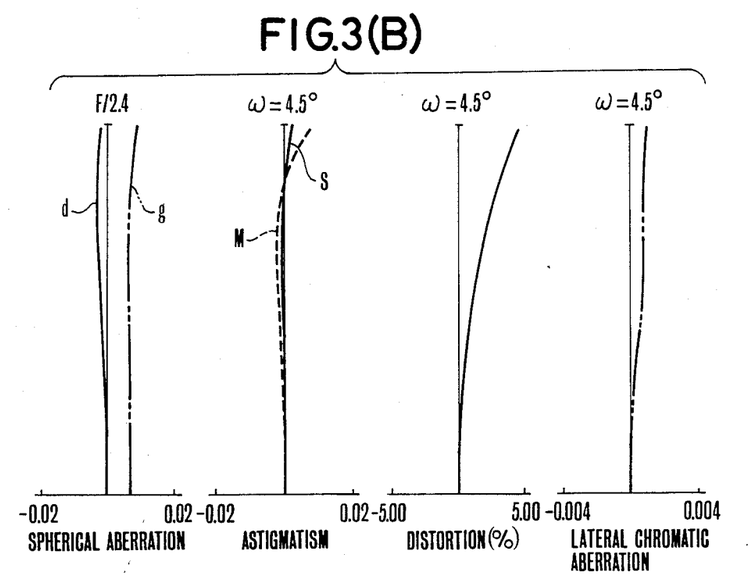

Numerical Example 2 (FIGS. 3(A) and 3(B))
F = 1–5.56  FNo = 1:1.6–2.4  2ω = 47.6°–9.0°

| | | | |
|---|---|---|---|
| R1 = 4.9314 | D1 = 0.0945 | N1 = 1.80518 | ν1 = 25.4 |
| R2 = 2.3926 | D2 = 0.5042 | N2 = 1.51633 | ν2 = 64.1 |
| R3 = −10.2219 | D3 = 0.0118 | | |
| R4 = 2.1255 | D4 = 0.3624 | N3 = 1.60311 | ν3 = 60.7 |
| R5 = 11.9694 | D5 = Variable | | |
| R6 = 5.5784 | D6 = 0.0630 | N4 = 1.69680 | ν4 = 55.5 |
| R7 = 0.9197 | D7 = 0.2721 | | |
| R8 = −1.1850 | D8 = 0.0630 | N5 = 1.69680 | ν5 = 55.5 |
| R9 = 1.1855 | D9 = 0.2285 | N6 = 1.84666 | ν6 = 23.9 |
| R10 = 10.6989 | D10 = Variable | | |
| R11 = −2.1763 | D11 = 0.0788 | N7 = 1.71300 | ν7 = 53.8 |
| R12 = −40.3230 | D12 = Variable | | |
| R13 = 9.2309 | D13 = 0.3545 | N8 = 1.69680 | ν8 = 55.5 |
| R14 = −1.7155 | D14 = 0.0788 | | |
| R15 = Stop | D15 = 0.1800 | | |
| R16 = 3.0328 | D16 = 0.2758 | N9 = 1.65844 | ν9 = 50.9 |
| R17 = −7.4073 | D17 = 0.1534 | | |
| R18 = −1.7877 | D18 = 0.0867 | N10 = 1.84666 | ν10 = 23.9 |
| R19 = −6.5984 | D19 = 0.0118 | | |
| R20 = 1.5956 | D20 = 0.2994 | N11 = 1.56384 | ν11 = 60.7 |
| R21 = 7.4734 | D21 = 0.8036 | | |
| R22 = 4.0283 | D22 = 0.0630 | N12 = 1.83400 | ν12 = 37.2 |
| R23 = 1.1962 | D23 = 0.0561 | | |
| R24 = 1.6708 | D24 = 0.3230 | N13 = 1.51823 | ν13 = 59.0 |
| R25 = −2.3852 | D25 = 0.0118 | | |
| R26 = 2.9824 | D26 = 0.1418 | N14 = 1.51742 | ν14 = 52.4 |
| R27 = ∞ | D27 = 0.3151 | | |
| R28 = ∞ | D28 = 0.3151 | N15 = 1.51633 | ν15 = 64.1 |
| R29 = ∞ | | | |

| f | 1 | 5.56 |
|---|---|---|
| D5 | 0.0907 | 1.5128 |
| D10 | 1.5412 | 0.2586 |
| D12 | 0.2329 | 0.0934 |
| Total Length = 8.0734 (= 9.15 · φ$_{EA}$) | | |

Figure 4A:
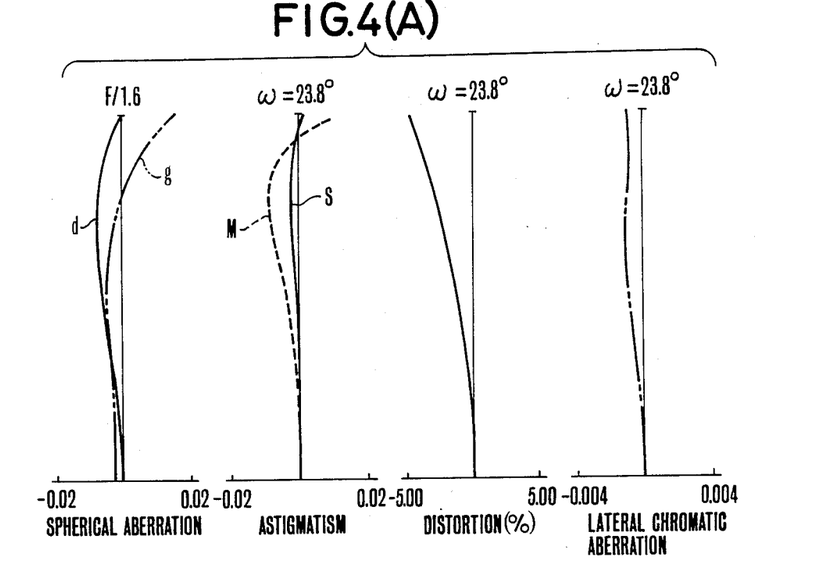
Figure 4B:
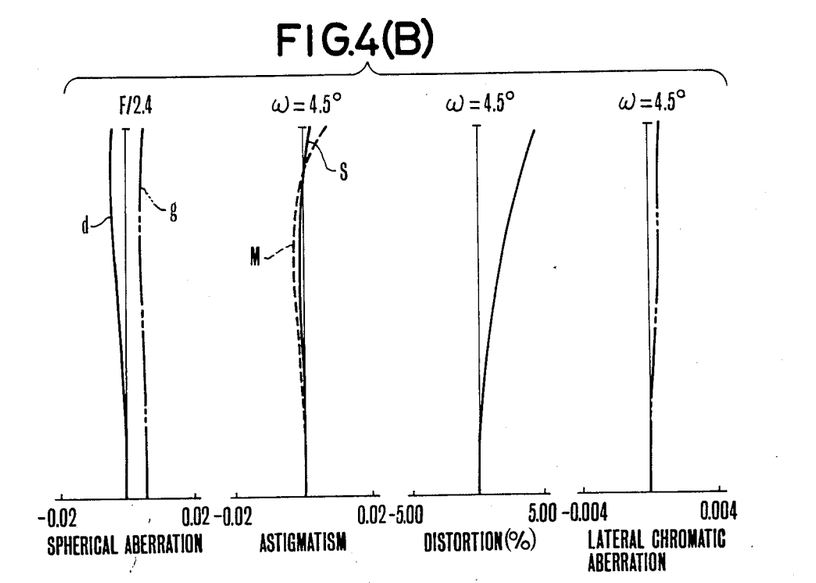

Numerical Example 3 (FIGS. 4(A) and 4(B))
F = 1–5.56  FNo = 1:1.6–2.4  2ω = 47.3°–9.18°

| | | | |
|---|---|---|---|
| R1 = 4.9866 | D1 = 0.0956 | N1 = 1.80518 | ν1 = 25.4 |
| R2 = 2.4194 | D2 = 0.5099 | N2 = 1.51633 | ν2 = 64.1 |
| R3 = −10.3364 | D3 = 0.0120 | | |
| R4 = 2.1493 | D4 = 0.3665 | N3 = 1.60311 | ν3 = 60.7 |
| R5 = 12.1034 | D5 = Variable | | |
| R6 = 5.6408 | D6 = 0.0637 | N4 = 1.69680 | ν4 = 55.5 |
| R7 = 0.9300 | D7 = 0.2752 | | |
| R8 = −1.1983 | D8 = 0.0637 | N5 = 1.69680 | ν5 = 55.5 |
| R9 = 1.1988 | D9 = 0.2310 | N6 = 1.84666 | ν6 = 23.9 |
| R10 = 10.8187 | D10 = Variable | | |
| R11 = −2.2007 | D11 = 0.797 | N7 = 1.71300 | ν7 = 53.8 |
| R12 = −40.7745 | D12 = Variable | | |
| R13 = 9.4928 | D13 = 0.3585 | N8 = 1.69680 | ν8 = 55.5 |
| R14 = −1.7292 | D14 = 0.0797 | | |
| R15 = Stop | D15 = 0.1593 | | |
| R16 = 3.1390 | D16 = 0.2788 | N9 = 1.65844 | ν9 = 50.9 |
| R17 = −7.0677 | D17 = 0.1502 | | |
| R18 = −1.8030 | D18 = 0.0876 | N10 = 1.84666 | ν10 = 23.9 |
| R19 = −6.3846 | D19 = 0.0120 | | |
| R20 = 1.5990 | D20 = 0.3027 | N11 = 1.56384 | ν11 = 60.7 |
| R21 = 7.3765 | D21 = 0.8126 | | |
| R22 = 4.2344 | D22 = 0.0637 | N12 = 1.83400 | ν12 = 37.2 |
| R23 = 1.2054 | D23 = 0.0700 | | |
| R24 = 1.7071 | D24 = 0.3266 | N13 = 1.51823 | ν13 = 59.0 |
| R25 = −2.3530 | D25 = 0.0120 | | |
| R26 = 3.0106 | D26 = 0.1434 | N14 = 1.51742 | ν14 = 52.4 |
| R27 = −95.6033 | D27 = 0.3187 | | |
| R28 = ∞ | D28 = 0.3187 | N15 = 1.51633 | ν15 = 64.1 |
| R29 = ∞ | | | |

| f | 1 | 5.56 |
|---|---|---|
| D5 | 0.0918 | 1.5297 |
| D10 | 1.5584 | 0.2615 |
| D12 | 0.2350 | 0.0939 |
| Total Length = 8.1461 (= 9.13 · φ$_{EA}$) | | |

Figure 5A:
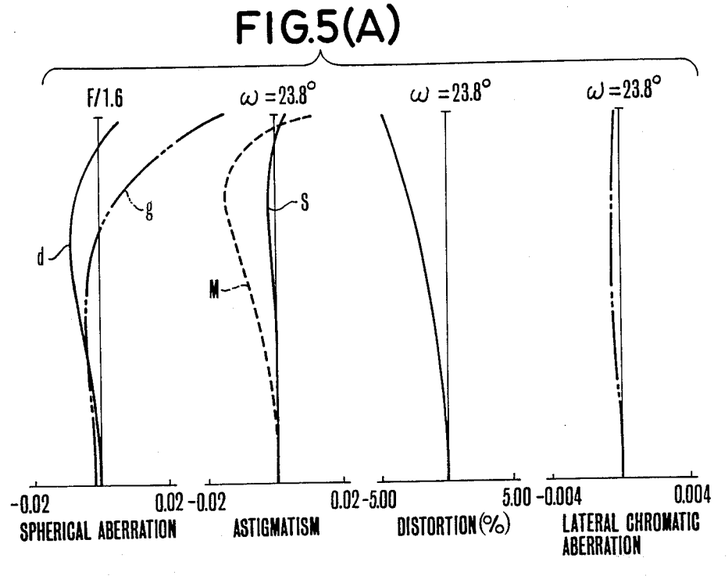
Figure 5B:
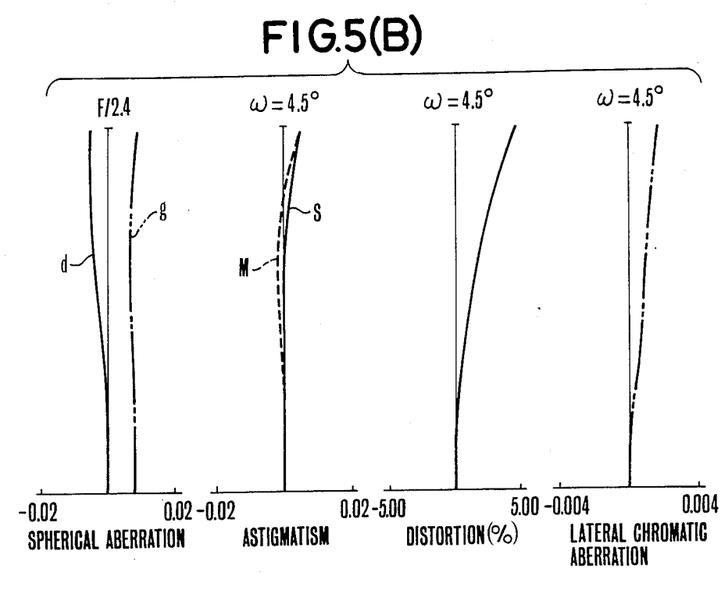

Numerical Example 4 (FIGS. 5(A) and 5(B))
F = 1–5.56  FNo = 1:1.6–2.4  2ω = 47.6°–9.0°

| | | | |
|---|---|---|---|
| R1 = 4.9254 | D1 = 0.1102 | N1 = 1.80518 | ν1 = 25.4 |
| R2 = 2.3897 | D2 = 0.4934 | N2 = 1.51633 | ν2 = 64.1 |
| R3 = −10.2094 | D3 = 0.0118 | | |
| R4 = 2.1229 | D4 = 0.3620 | N3 = 1.60311 | ν3 = 60.7 |
| R5 = 11.9548 | D5 = Variable | | |
| R6 = 5.5715 | D6 = 0.0630 | N4 = 1.69680 | ν4 = 5.5 |
| R7 = 0.9186 | D7 = 0.2718 | | |
| R8 = −1.1836 | D8 = 0.0630 | N5 = 1.69680 | ν5 = 55.5 |
| R9 = 1.1841 | D9 = 0.2282 | N6 = 1.84666 | ν6 = 23.9 |
| R10 = 10.6858 | D10 = Variable | | |
| R11 = −2.1737 | D11 = 0.0787 | N7 = 1.71300 | ν7 = 53.8 |
| R12 = −40.2737 | D12 = Variable | | |
| R13 = 9.2196 | D13 = 0.3541 | N8 = 1.69680 | ν8 = 55.5 |
| R14 = −1.7134 | D14 = 0.0787 | | |
| R15 = Stop | D15 = 0.1479 | | |
| R16 = 3.4482 | D16 = 0.2675 | N9 = 1.51633 | ν9 = 64.1 |
| R17 = −5.6826 | D17 = 0.1841 | | |
| R18 = −1.5079 | D18 = 0.0866 | N10 = 1.84666 | ν10 = 23.9 |
| R19 = −2.8542 | D19 = 0.0118 | | |
| R20 = 1.5567 | D20 = 0.3620 | N11 = 1.60311 | ν11 = 60.7 |
| R21 = −43.2099 | D21 = 0.6372 | | |
| R22 = −5.5552 | D22 = 0.0630 | N12 = 1.83400 | ν12 = 37.2 |
| R23 = 1.3759 | D23 = 0.1036 | | |
| R24 = 4.4717 | D24 = 0.3305 | N13 = 1.51633 | ν13 = 64.1 |
| R25 = −1.3545 | D25 = 0.0118 | | |
| R26 = 2.0246 | D26 = 0.2203 | N14 = 1.51742 | ν14 = 52.4 |
| R27 = ∞ | D27 = 0.3148 | | |
| R28 = ∞ | D28 = 0.3148 | N15 = 1.51633 | ν15 = 64.1 |
| R29 = ∞ | | | |

| f | 1 | 5.56 |
|---|---|---|
| D5 | 0.0885 | 1.5088 |
| D10 | 1.5393 | 0.2583 |
| D12 | 0.2326 | 0.0933 |
| Total Length = 8.0698 (= 9.16 · φ$_{EA}$) | | |

TABLE 1

| Conditions | Numerical Example 1 | Numerical Example 2 | Numerical Example 3 | Numerical Example 4 |
|---|---|---|---|---|
| (1) $|R_{4,2}/F_4|$ | 0.8156 | 0.8153 | 0.8129 | 0.8153 |
| (2) $|f_{5,2}/F_5|$ | 1.1123 | 1.1068 | 1.1329 | 1.4736 |
| (3) $|f_{5,4}/f_{5,5}|$ | 1.2187 | 1.0575 | 1.0392 | 0.6413 |
| (4) $(\nu_{5,1} + \nu_{5,6})/2$ | 51.65 | 51.65 | 51.65 | 58.25 |
| (5) $|F_2/F_w|$ | 0.7874 | 0.7880 | 0.7968 | 0.7870 |
| Total Length | 9.19φ$_{EA}$ | 9.15φ$_{EA}$ | 9.13φ$_{EA}$ | 9.16φ$_{EA}$ |

TABLE 1-continued

| Conditions of Lens | Numerical Example 1 | Numerical Example 2 | Numerical Example 3 | Numerical Example 4 |
| --- | --- | --- | --- | --- |

It will be appreciated from the foregoing that according to the present invention, it is made possible to realize a large relative aperture, high range zoom lens of reduced size, while still preserving high grade optical performance, suited to photographic camera or video camera.

In particular, the present invention has achieved a great advance in reduction of the size of the zoom lens in terms of the total length to as short as $L=9.13\phi_A$ to $9.19\phi_A$.

What is claimed is:

1. A zoom lens comprising, from front to rear, a first lens unit of positive refractive power for focusing, a second lens unit of negative refractive power having a magnification varying function, a third lens unit of negative refractive power for compensating for an image shift resulting from the variation of the image magnification, a fourth lens unit having a biconvex lens for making up an almost parallel light beam from a diverging light beam from said third lens unit, and a fifth lens unit having an image forming function and having positive, negative, positive, negative, positive and positive lens, wherein letting the focal length of the j-th lens of the i-th lens unit be denoted by $f_{i,j}$, the radius of curvature of the j-th lens surface of the i-th lens unit by $R_{i,j}$, the Abbe number of the glass of the j-th lens of the i-th lens unit by $\nu_{i,j}$ and the focal length of the i-th lens unit by Fi, the following conditions being satisfied:

$0.7 < |R_{4,2}/F_4| < 0.85$ $1.05 < |f_{5,2}/F_5| < 1.5$ $0.6 < |f_{5,4}/f_{5,5}| < 1.5$ $50 < (\nu_{5,1} + \nu_{5,6})/2 < 59.$

2. A zoom lens according to claim 1, further satisfying the following conditions:

$0.75 < |F_2/Fw| < 0.85$ where Fw is the shortest focal length of the entire lens system.

3. A zoom lens according to claim 1, wherein said biconvex fourth lens unit has a strong curvature on the image side.

4. A zoom lens according to claim 1, wherein said fifth lens unit includes a biconvex lens having a strong curvature on the object side, a negative meniscus lens of forward concavity, a positive lens having a strong convex surface facing the front, followed after a large air space by, a negative meniscus lens of rearward concavity, a biconvex lens, and a positive lens having a strong convex surface facing the front.

5. A zoom lens comprising, from front to rear, a first lens unit of positive refractive power for focusing, a second lens unit of negative refractive power having a magnification varying function, a third lens unit of negative refractive power for compensating for an image shift resulting from the variation of the image magnification, a fourth lens unit having a biconvex lens for making up an almost parallel light beam from the diverging light beam from said third lens unit, and a fifth lens unit having an image forming function and having positive, negative, positive, negative, positive and positive lens, wherein letting the focal length of the j-th lens of the i-th lens unit be denoted by $f_{i,j}$, the radius of curvature of the j-th lens surface of the i-th lens unit by $R_{i,j}$, the Abbe number of the glass of the j-th lens of the i-th lens unit by $\nu_{i,j}$ and the focal length of the i-th lens unit by Fi, the following conditions being satisfied:

$0.7 < |R_{4,2}/F_4| < 0.85$ $1.05 < |f_{5,2}/F_5| < 1.5$ $0.6 < |f_{5,4}/f_{5,5}| < 1.5$ $50 < (\nu_{5,1} + \nu_{5,6})/2 < 59$ $0.75 < |F_2/Fw| < 0.85.$

* * * * *

UNITED STATES PATENT AND TRADEMARK OFFICE
CERTIFICATE OF CORRECTION

PATENT NO. : 4,846,563

DATED : July 11, 1989

INVENTOR(S) : HITOSHI MUKAIYA

It is certified that error appears in the above-identified patent and that said Letters Patent is hereby corrected as shown below:

At column 1, line 10, "me" should read --be--.

At column 2, line 36, "curvatyre" should read --curvature--.

At column 2, line 57, " ijtge" should read --in the--.

Signed and Sealed this

Twenty-ninth Day of May, 1990

*Attest:*

HARRY F. MANBECK, JR.

*Attesting Officer*  *Commissioner of Patents and Trademarks*